United States Patent [19]

Abersfelder et al.

[11] Patent Number: 5,685,160
[45] Date of Patent: Nov. 11, 1997

[54] METHOD FOR OPERATING AN AIR CONDITIONING COOLING SYSTEM FOR VEHICLES AND A COOLING SYSTEM FOR CARRYING OUT THE METHOD

[75] Inventors: Guenter Abersfelder, Sindelfingen; Juergen Maue, Leinfelden-Echterdingen; Juergen Wertenbach, Fellbach, all of Germany

[73] Assignee: Mercedes-Benz AG, Stuttgart, Germany

[21] Appl. No.: 525,067

[22] Filed: Sep. 8, 1995

[30] Foreign Application Priority Data

Sep. 9, 1994 [DE] Germany .................. 44 32 272.0

[51] Int. Cl.$^6$ .................................. F25B 1/00
[52] U.S. Cl. .................... 62/114; 62/115; 62/228.5
[58] Field of Search ............... 62/228.5, 229, 62/228.4, 502, 511, 228.3, 323.3, 174, 115, 119, 114

[56] References Cited

U.S. PATENT DOCUMENTS

| | | | |
|---|---|---|---|
| 4,463,576 | 8/1984 | Burnett et al. | 62/228.3 |
| 5,172,563 | 12/1992 | Fujii | 62/228.5 X |
| 5,245,836 | 9/1993 | Lorentzen et al. | 62/174 |
| 5,247,808 | 9/1993 | Yoshida et al. | 62/323.3 X |

FOREIGN PATENT DOCUMENTS

| | | |
|---|---|---|
| 0 424 474 | 5/1991 | European Pat. Off. . |
| 32 30 813 | 2/1984 | Germany . |
| 35 10 776 | 10/1986 | Germany . |
| 38 34 278 | 6/1989 | Germany . |
| 43 20 145 | 12/1993 | Germany . |
| 64-49852 | 2/1989 | Japan . |
| 1-60917 | 4/1989 | Japan . |
| 3-503206 | 7/1991 | Japan . |
| WO 90/07683 | 7/1990 | WIPO . |

*Primary Examiner*—Harry B. Tanner
*Attorney, Agent, or Firm*—Evenson, McKeown, Edwards & Lenahan, P.L.L.C.

[57] ABSTRACT

A method for operating a refrigerating unit for the air conditioning of vehicles and a refrigerating unit for carrying out the method, are provided. In order to make available refrigerating capacity, on the high pressure side of a vapor compression circuit, a pressure is produced which, with respect to the critical pressure of a refrigerant circulating in the circuit, is supercritical and, at the same time, on the low pressure side of the circuit, a subcritical pressure is achieved. In this arrangement, the circuit contains a compressor, a gas cooler, a throttle device and an evaporator which are series-connected and form an integral, closed circuit. The refrigerant, which is cooled on the low pressure side, is supplied, via the evaporator, with thermal energy, and refrigerating energy is removed. In order to increase the efficiency and the comfort of the system to such an extent that an air conditioning system operating with this unit is suitable for use in a vehicle, the refrigerant mass flow in the circuit is varied by regulating the refrigerant flow rate in the compressor.

33 Claims, 4 Drawing Sheets

METHOD FOR OPERATING AN AIR CONDITIONING COOLING SYSTEM FOR VEHICLES AND A COOLING SYSTEM FOR CARRYING OUT THE METHOD

BACKGROUND AND SUMMARY OF THE INVENTION

The invention relates to a method for operating a cooling system for the air conditioning of vehicles and, more particularly, to a method in which, in order to make available refrigerating capacity, a pressure is produced on the high pressure side of a vapor compression circuit containing a compressor, a gas cooler, a throttle device and an evaporator all connected in series forming an integral, closed circuit. With respect to the critical pressure of a refrigerant circulating in the circuit, the pressure produced is supercritical. At the same time, on the low pressure side of the circuit, a subcritical pressure is achieved. The cold refrigerant on the low pressure side is supplied via the evaporator with thermal energy. The refrigerating energy is removed.

The invention further relates to a cooling system for carrying out the method and, more particularly, to a cooling system having a compressor, a gas cooler, a throttle device and an evaporator all series-connected forming an integral, closed vapor compression circuit for the refrigerant. The circuit is divided, during operation of the cooling system, into a high pressure side and a low pressure side. On the high pressure side, a pressure is set with respect to the critical pressure of the refrigerant.

A known method and cooling apparatus for operating a cooling system is disclosed in European Patent document EP 0 424 474. In this document, a process control method is described for a vapor compression circuit. The circuit contains a compressor, a cooler, a throttle valve and an evaporator which are connected successively in series and form an integral, closed circuit operating at a supercritical pressure on the high pressure side of the circuit. In the described method, a change in the pressure by way of a change in the filling level of a buffer container, which is additionally integrated in the circuit on the low pressure side, at virtually constant mass flow on the high pressure side of a supercritical refrigerating process, has an effect on the specific enthalpy of the refrigerant. By varying the difference in the enthalpy of the refrigerant upstream of the throttle point and, behind the throttle point, upstream of the inlet opening of the evaporator, it is possible for the refrigerating capacity to be controlled. After compression, the refrigerant is cooled down as far as possible in the gas cooler, through the use of a cooling medium flowing around the gas cooler, to the extent technically practical. Controlling the throttle valve permits a pressure to be set on the high pressure side so as to achieve the difference in enthalpy desired in each case. The refrigerating capacity which is obtained at the evaporator increases with increasing pressure and falls with decreasing pressure on the high pressure side.

A parameter which denotes the efficiency of supercritical circuit processes is termed the "Coefficient of Performance" (COP), which is defined as the ratio between the refrigerating capacity and the compressor drive power used. For the anticipated operating conditions, which, for example, are defined by the evaporation temperature and the refrigerant temperature at the gas cooler outlet, i.e., the condenser, data are prepared by calculation and measurement. The data establish the refrigerating capacity (Qo), the drive power to be used and their ratio (COP) as a function of the pressure on the high pressure side. At a certain pressure on the high pressure side, the COP consequently exhibits a maximum, as a function of the operating conditions. This data is used to produce a limit on the technically practical high pressure to be set on the high pressure side of the supercritical refrigerating circuit in the region of the maximum COP.

Proceeding from this, in the case of known pressure controls, the COP increases as the pressure increases on the high pressure side, i.e. as the requirement for refrigerating capacity increases, but only to a certain amount. After this it begins to decrease since the refrigerating capacity obtained in the process is no longer able to compensate for the additional work during compression. In the case of a very low refrigerating capacity requirement, the throttle device is initiated. This results in the difference in enthalpy becoming small. However, the COP also becomes very small as a result, i.e. a high compression power is produced and only a small amount of this is converted into refrigerating capacity, thus making the known circuit process extremely inefficient.

The known manner of controlling the power hence has, as regards efficiency considerations, only a limited range of control which varies between a lower and an upper refrigerating-capacity value of between approximately 2 and 10 kW, and which can be made available to a consumer. As a result however, refrigerating capacity is also made available even if the requirement for cooling is low, or if it exists at all. It is hence not possible, because of the availability of cooling, for an air conditioning system operating according to the known method to be matched individually to the passenger's requirements. The system thus results in only mediocre comfort and hence is unsuitable for a vehicle.

There is therefore needed a method and cooling system according to the above-described type such that the efficiency and comfort of the system are increased to such an extent that an air conditioning system operating with this system is suitable for use in a vehicle.

These needs are met according to the present invention by a method in which, in order to make available refrigerating capacity, a pressure is produced on the high pressure side of a vapor compression circuit containing a compressor, a gas cooler, a throttle device and an evaporator all connected in series forming an integral, closed circuit. With respect to the critical pressure of a refrigerant circulating in the circuit, the pressure produced is supercritical. At the same time, on the low pressure side of the circuit, a subcritical pressure is achieved. The cold refrigerant on the low pressure side is supplied via the evaporator with thermal energy. The refrigerating energy is removed. The method according to the present invention varies the refrigerant mass flow in the circuit by regulating the refrigerant flow rate in the compressor.

These needs are further met by a cooling system for carrying out the method and, more particularly, to a cooling system having a compressor, a gas cooler, a throttle device and an evaporator all series-connected forming an integral, closed vapor compression circuit for the refrigerant. The circuit is divided, during operation of the cooling system, into a high pressure side and a low pressure side. On the high pressure side, a pressure is set with respect to the critical pressure of the refrigerant. With respect to the critical pressure of a refrigerant circulating in the circuit, the pressure produced is supercritical. The flow rate through the compressor is controlled.

The invention makes possible a circuit process in which refrigerating capacity can be made available to a sufficient extent under all operating conditions of the vehicle and under all ambient conditions. In the process, a variable quantity of refrigerant, depending on requirements, is delivered via the control system through the compressor, thereby making it possible for a variable mass of refrigerant and hence variable refrigerating capacity to be made available at the evaporator in accordance with requirements.

The transport of refrigerant is largely independent of the process pressure in the circuit so that the cooling system can always be operated in the region of the maximum COP, even if the requirement for refrigerating capacity is very high or at a minimum. As a result, a control range from zero to a maximum achievable value is provided for the refrigerating capacity, to the extent which is technically practical, at a high COP, i.e., the circuit is highly efficient with respect to its coefficient of performance, thereby resulting in very high air conditioning comfort.

In this arrangement, if there is no requirement for refrigerating capacity, then the compressor is allowed to idle. When a requirement arises, by virtue of the appropriate control of its flow rate, by means of a slow, continuous increase in the load as regards the delivery of the refrigerant, a gentle increase in the availability of refrigerating capacity up to the desired value is made possible. Owing to the high degree of comfort—only as much refrigerating capacity is made available as is required—accompanied at the same time by the circuit having a high coefficient of performance or high efficiency, the use of an air conditioning system in a vehicle equipped with a cooling system designed in this manner is therefore practical and hence suitable in a vehicle.

Other objects, advantages and novel features of the present invention will become apparent from the following detailed description of the invention when considered in conjunction with the accompanying drawings.

DETAILED DESCRIPTION OF THE DRAWINGS

Figure 1:
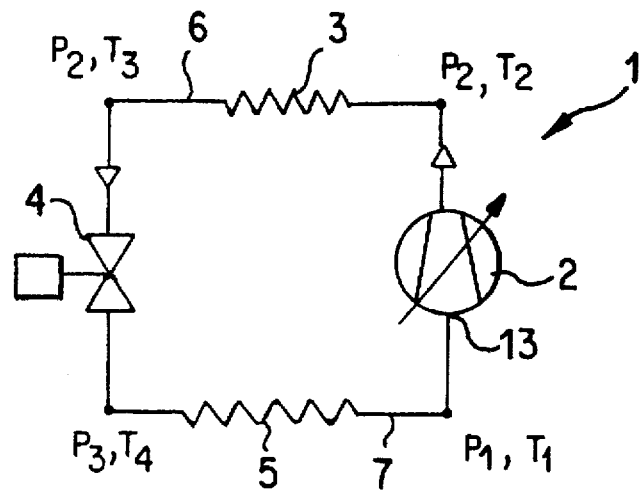
FIG. 1 is a circuit diagram of a vapor compression circuit, operating according to the method of the invention, with a controllable compressor and a controllable throttle device.

Referring to FIG. 1, a vapor compression circuit 1 is illustrated which contains, connected in series successively one behind another, a compressor 2, a gas cooler 3, a throttle device 4 and an evaporator 5. In this arrangement, the flow rate through the compressor 2 can be controlled. The throttle device 4, which can be designed as an expansion valve, can likewise be controlled.

Figure 2:
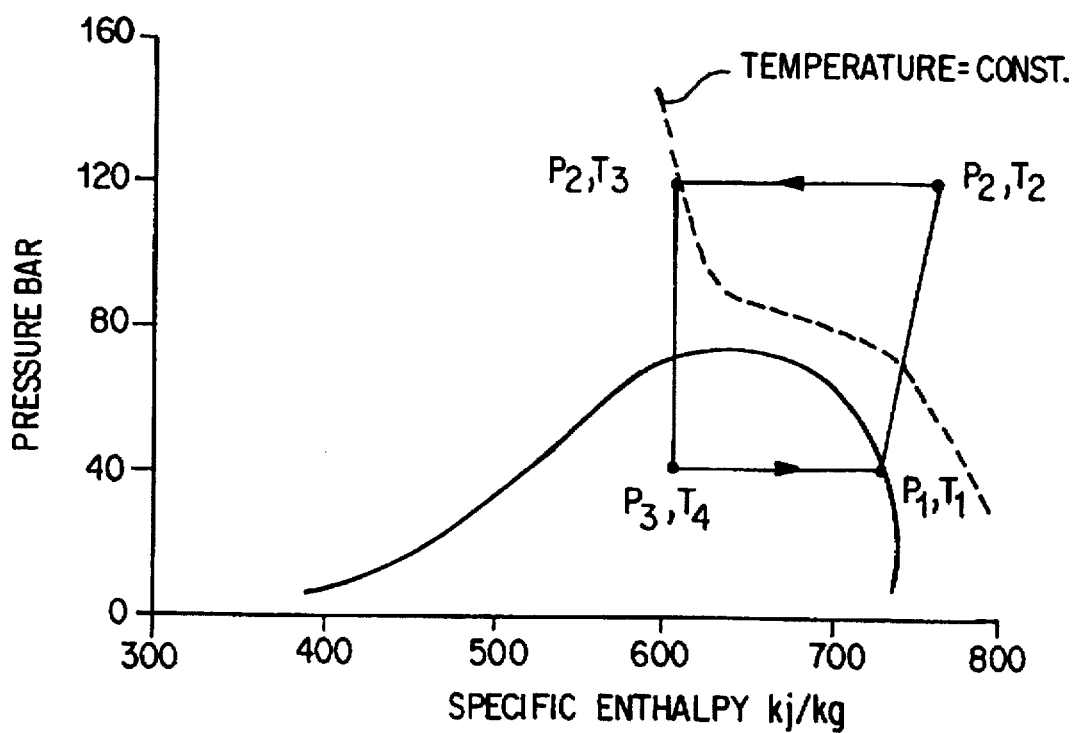
FIG. 2 is an enthalpy/pressure diagram of a transcritical process for the circuit of FIG. 1.

If the compressor 2 operates under load, it compresses, according to FIG. 2, a quantity of refrigerant from an initial pressure $p_1$ to a higher pressure $P_2$ the process temperature rising from $T_1$ to $T_2$. The compressed, gaseous refrigerant is then cooled in the gas cooler 3 isobarically to a temperature $T_3$ by means of a coolant, for example cold air or water, flowing around the gas cooler. On flowing through the expansion valve 4, the coolant is expanded isenthalpically to a pressure $p_3$ corresponding to the initial pressure $p_1$. The coolant is further cooled to a temperature $T_4$ lying in the condensing range of the refrigerant. If the gas/liquid two-phase mixture of refrigerant produced in this manner reaches the evaporator 5, the liquid portion evaporates and the very cool gas portion heats up there, producing a cooling effect or absorbing heat from outside. In the process, the initial temperature $T_1$ is again reached.

The refrigerating capacity made available at the evaporator 5 is calculated from the product of the mass flow of the coolant and the difference in enthalpy between the high pressure side 6 and the low pressure side 7 of the circuit 1. In order to meet the requirement present for refrigerating capacity, the compressor 2 in this case is configured such that it can be controlled. As a result, the coolant flow rate through the compressor 2 and hence the mass flow in the circuit 1 can be matched to this requirement.

When using the cooling system in a motor vehicle, if, in this arrangement, maximum efficiency of the cooling system is simultaneously desired under all operating conditions of the vehicle and ambient conditions, i.e., it is desired for the efficiency to remain at the COP maximum, then it is necessary for the expansion valve 4 to be provided with a control system which is correlated with the control system of the compressor 2. In this arrangement, in the simplest design of the valve 4, its aperture cross-section is opened wider as the quantity of refrigerant delivered by the compressor 2 increases. A maximum refrigerant quantity delivered is reached when the difference in pressure between the high pressure side 6 and low pressure side 7 becomes too low for the expansion valve 4 to provide sufficient expansion for cooling of the circuit process. This state is at least provided whenever there is no longer any throttling action, i.e. if the aperture cross-section corresponds to the cross-section of the line carrying refrigerant before and after the throttle point. If, however, the difference in pressure is sufficiently large, the delivery of coolant proceeds at a constant pressure ratio in the circuit 1, even in the event of a change which always occurs when matching the power to meet a new requirement.

Figure 3:
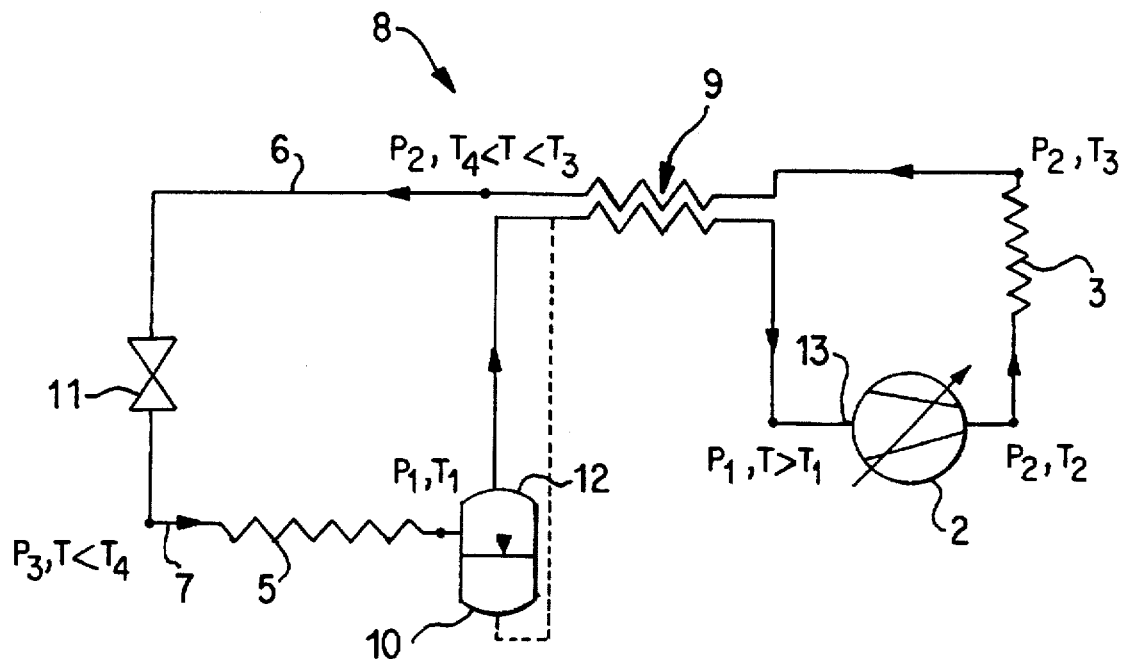
FIG. 3 is a circuit diagram of the vapor compression circuit, operating according to the method of the invention, from FIG. 1, with a buffer container and a counterflow heat exchanger and a constant throttle valve.

FIG. 3 shows an alternative circuit 8 to the circuit 1 of the previous exemplary embodiment. In contrast to the circuit 1, the circuit 8 additionally contains a counterflow heat exchanger 9 and a buffer container 10. The throttle device is designed as a constant throttle valve 11. All of the additional circuit components are likewise series-connected with the previous components in the integral circuit. The high pressure part of the counterflow heat exchanger 9 is arranged between the gas cooler 3 and the constant throttle valve 11 on the high pressure side 6 of the circuit 8, whereas the low pressure part is situated between the evaporator 5 and the compressor 2 on the low pressure side 7. The buffer container 10 is connected at one end to the outlet of the evaporator 5 and at the other end, via its outlet 12 for gaseous refrigerant, to the/low pressure part of the counterflow heat exchanger 9.

In an identical manner to the circuit according to FIG. 2 the controllable compressor 2 compresses a certain quantity of refrigerant with a cooling effect in the gas cooler 3. The cooled refrigerant is then fed through the high pressure part of the counterflow heat exchanger 9 in which it is yet further isobarically cooled. Expansion through the constant throttle valve 11 allows the coolant to be reduced isenthalpically to even lower temperatures compared to those in the example of the circuit 1. At the evaporator 5, a liquid portion of the two-phase mixture is evaporated with heat absorption. The remaining portion of the refrigerant which is still liquid then collects in the buffer container 10. The substantially gaseous portion flows into the low pressure part of the counterflow heat exchanger 9, is further heated there, and passes from there into the compressor 2.

Figure 4:
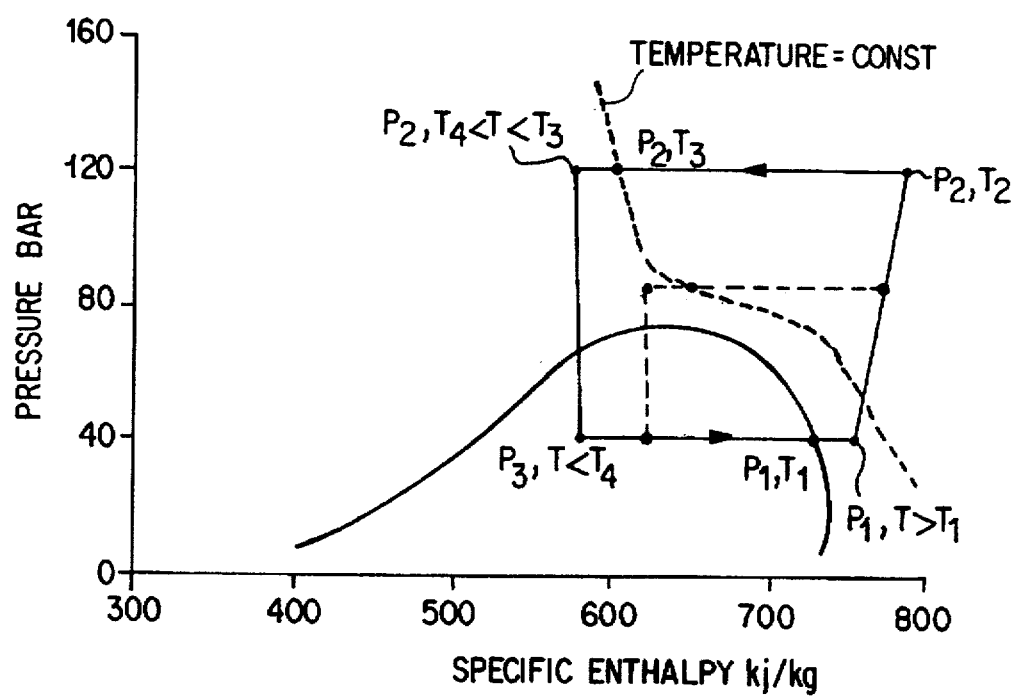
FIG. 4 is an enthalpy/pressure diagram of a transcritical process for the circuit of FIG. 3.

When the requirement for refrigerating capacity is higher, the compressor 2 delivers a correspondingly larger quantity of refrigerant. Since the throttle device here cannot be controlled, there simultaneously occurs an increase in pressure on the high pressure side 6 of the circuit 8 and hence an increase in the difference in enthalpy. The quantity of coolant in the entire circuit is likewise displaced in the direction of the high pressure side 6. Owing to the increased difference in enthalpy and the simultaneously increased mass flow due to the increase in flow rate through the compressor 2, more refrigerating capacity is made available than in the case of comparable delivery power in the circuit 1. As a result, to meet the desired requirement for refrigerating capacity, a smaller delivered quantity and thus also a lower delivered power are required at the compressor 2. Because of the change in pressure taking place on the high pressure side 6 for different refrigerating requirements, in this arrangement each refrigerating capacity is assigned a very specific circuit 8, as FIG. 4 illustrates. For higher refrigerating capacities, the pressure head is displaced to higher pressures, i.e. the area delimited by the thermodynamic circuit becomes larger. For lower refrigerating capacities, the pressure head is displaced to lower pressures, i.e. the area delimited by the thermodynamic circuit becomes smaller.

By virtue of the simultaneous change in the refrigerant mass flow which occurs when adjusting the refrigerating capacity due to pressure variations on the high pressure side 6, the circuit efficiency is partially compensated for. The circuit efficiency falls when there is a very high and very low requirement for refrigerating capacity. However, it is not possible, in the above-mentioned refrigerating capacity requirement regions, to allow the cooling process to proceed at maximum COP. An advantage of the circuit 8 is that it obviates the need for a complex valve control mechanism for the expansion valve, with which operation at maximum COP in every region and under all driving conditions and ambient conditions would be possible.

Moreover, because the buffer container 10 is able to store refrigerant when there is a very high accumulation of refrigerant on the high pressure side 6 of the circuit 8, the buffer container 10 is able to prevent a sharp drop in the intake pressure in the evaporator 5 when there is a high requirement for refrigerating capacity. At the same time, the buffer container 10 collects excess quantities of refrigerant from the circuit 8 when there is a low requirement for refrigerating capacity, i.e. when there are lower pressures on the high pressure side 6 of the circuit 8. In addition, the buffer container 10 compensates for the quantity of refrigerant leaked from the circuit 8. Furthermore, an adsorbent is included in the buffer container 10 to absorb any water in the circuit so as to prevent the formation of corrosive carbon dioxide.

By virtue of the additional cooling of the refrigerant after it has passed through the gas cooler 3, the counterflow heat exchanger 9 improves the available refrigerating capacity at the evaporator 5 and hence the efficiency of the refrigerating process and thus of the cooling system. It furthermore serves to recycle lubricating oil to the compressor 2 which enters the circuit 8 from the compressor 2.

Figure 7:
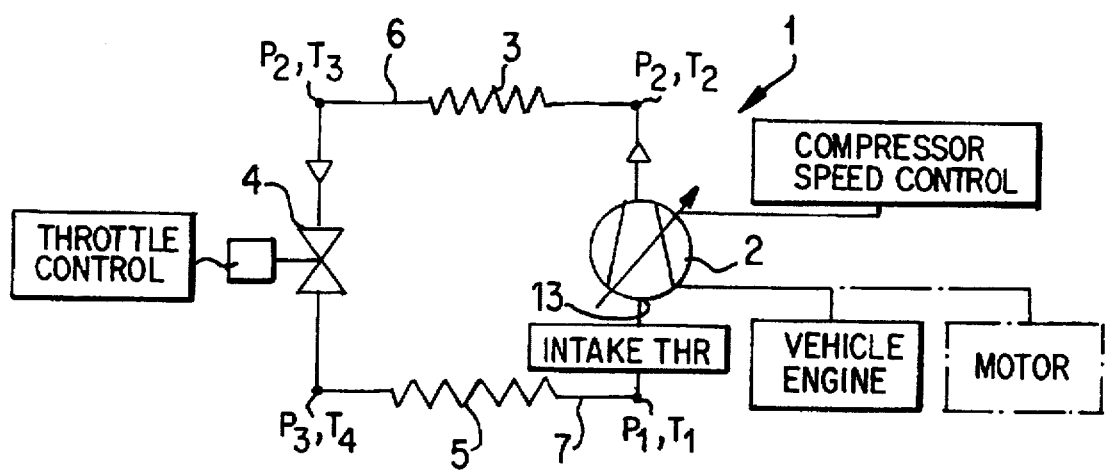
FIG. 7 is a circuit block diagram of the present invention.

The flow rate through the compressor 2 can be controlled in various ways. One way is by changing the driving speed of the compressor, another way is by changing its compression stroke, and yet another is by changing its final compression volume. It is also conceivable to control the intake quantity of refrigerant on the intake side 13 by way of a controllable intake throttle which the compressor 2 has at this point. In this arrangement, an increase in the refrigerant flow rate and hence an increase in the mass flow in the circuit 1 or 8 is respectively achieved with increasing compression stroke, decreasing final compression volume, increasing intake quantity of refrigerant and increasing speed of the compressor drive (FIG. 7). A reduction in the flow rate of the refrigerant takes place in a correspondingly reverse order.

Figure 5:
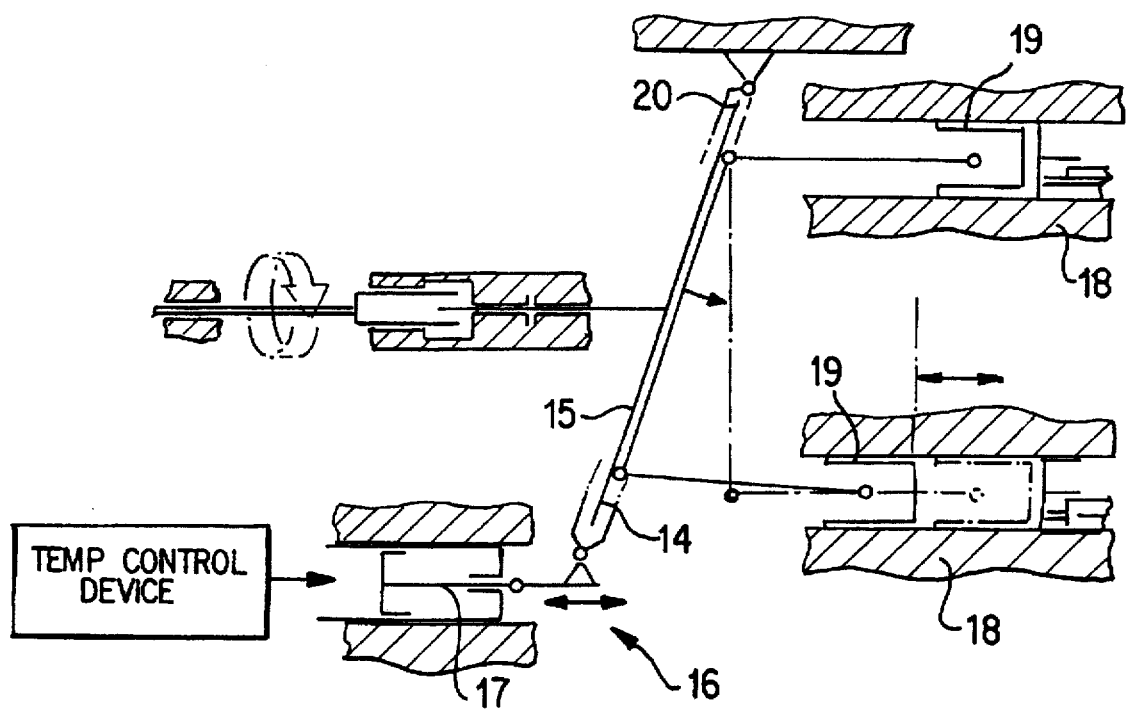
FIG. 5 is a schematic sketch of the compressor from FIG. 1 and FIG. 3 as a swashplate compressor with compression stroke adjustment.

The compressor 2 can be designed as a swashplate compressor according to FIG. 5. For changing the compression stroke, the compressor 2 has, on its respectively lower circumferential region 14 of the swashplate 1 15, an adjusting device 16. The adjusting device 16 can be based on the principle of a displaceable control piston 17. By displacing the control piston 17 in parallel to the direction of movement of the compression pistons 19, which are acted upon by the swashplate 15 and are guided in compressor cylinders 18, the adjusting device 16 brings about a radial movement of the swashplate 15 which, at its upper circumferential region 20, is movably mounted. The one compression piston 19 shown with broken lines shows the position of the compressor 2 in the case of a minimum compression stroke.

Figure 6:
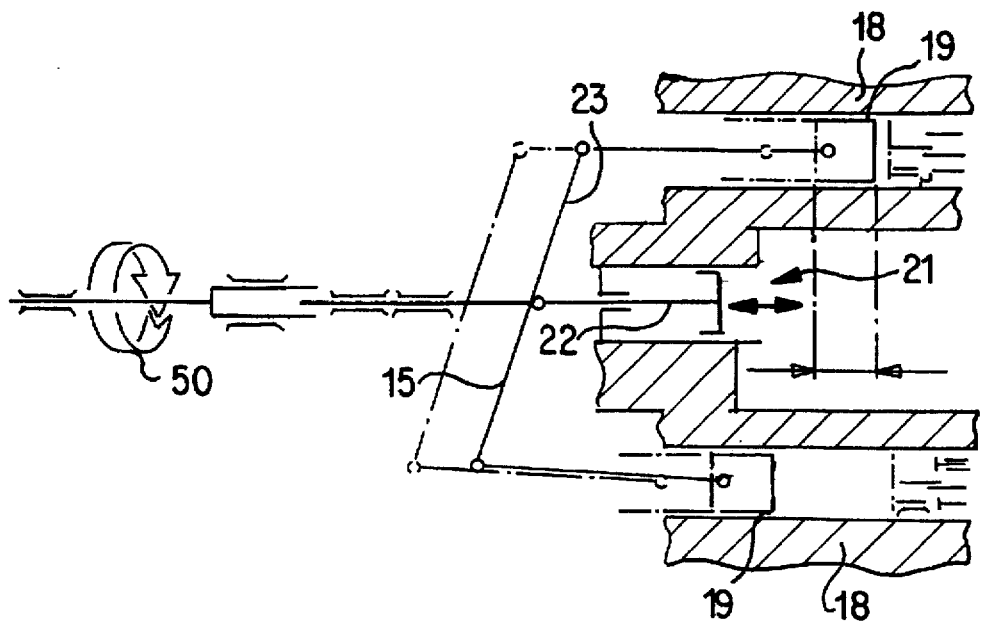
FIG. 6 is a schematic sketch of the compressor from FIG. 1 and FIG. 3 as a swashplate compressor with adjustment of the final compression volume.

FIG. 6 illustrates the principle for changing the final compression volume of the compressor 2. In FIG. 6, use is made of an adjusting device 21 which is likewise based on a control piston 22 being displaced parallel to the position of the compression cylinder 18. Here, however, the control piston 22 centrally engages on the swashplate 15, on the side 23 which faces the compression cylinders 18. As a result, when the control piston 22 is displaced, the swashplate 15 undergoes axial displacement resulting in displacement of the top dead center of the compression pistons 19 and hence in a change in the final compression volume. The compression piston 18 shown with broken lines shows a position in the case of a very high final compression volume.

To improve the control response of the compressor, it is moreover conceivable to provide all, or at least two, of the differently designed adjusting devices simultaneously at the compressor 2 and to connect them to one another. Furthermore, it is also possible for a plurality of compressors 2 to be connected one behind another in series, or in parallel to one another, in the circuit, instead of one compressor.

The adjusting devices for the changes in speed, intake quantity, final compression volume and compression stroke of the compressor 2 can be operated manually, via a knurled wheel 50 (FIG. 6) within the passenger compartment, depending on the refrigerating capacity requirement, whereupon the circuit, depending on the position established, produces the refrigerating capacity required in each individual case. This refrigerating capacity value is established in so far as there is no manual change in the adjustment.

As an alternative, it is possible according to the invention to set a certain temperature for the interior of the passenger compartment. The adjusting devices and, hence, the circuit are automatically controlled as a function of the ambient conditions and the driving mode. This control is done by way of a control device (FIG. 5) in each case in accordance with an electronically stored characteristic map. In the process, the available cooling power changes with a change in the ambient conditions until the set temperature is reached.

The drive of the compressor 2 can be connected, independently of the engine of the vehicle, to a motor separate from the engine (FIG. 7—see dotted line connection), in particular an electric motor. The electric motor obtains its electrical energy from a battery or a generator which is connected to the vehicle engine. This makes a flexible arrangement possible for the cooling system in the vehicle.

In a different design, the drive of the compressor 2 can also be directly connected to the engine of the vehicle (FIG. 7—see dotted line connection). In this case, although the arrangement of the cooling system is essentially established, the system can be constructed such that it is very compact and hence saves space owing to the absence of a separate motor and generator. This is especially favorable in particular for use in very small motor vehicles in which the constructional space is limited. Furthermore, with the omission of the generating components and separate drive components, all of the mechanical and electrical power losses associated with these components are simultaneously omitted. When the compressor 2 is directly driven via the vehicle engine it must, however, be ensured, in order to bring about matching of the refrigerating capacity to the particular requirements, that when use is made of an adjusting device, with which the speed of the compressor drive can be controlled, its adjusting drive is not connected to the engine of the vehicle. Since the flow rate of refrigerant through the compressor 2 is dependent, via the drive of the vehicle engine, on the speed thereof, it is expedient for the adjusting activity of the particular adjusting device to be influenced in each case as a function of the respectively current operating range of the vehicle engine in order to prevent the generation of excessive or much too low refrigerating capacity due to excessively high or excessively low flow rate of refrigerant, and in order, as a result, to obtain the desired constant refrigerating capacity or a constant internal temperature in the vehicle.

As a refrigerant, $CO_2$ or another environmentally compatible, non-combustible, non-toxic refrigerant which operates under transcritical pressure conditions is provided for the circuit operating at transcritical pressure.

Use is currently predominantly made of cold vapor cooling systems with fluorohydrocarbons (FCs) or with chlorofluorohydrocarbons (CFCs) as refrigerant for air conditioning the interior air in a vehicle. These refrigerants have in the meantime turned out to make a decisive contribution to depleting the ozone layer of the atmosphere, and they are also partly held responsible for the greenhouse effect. A new goal in the development of vehicle air conditioning systems is therefore to introduce a cold-vapor cooling process which avoids the use of FCs and CFCs and instead uses, in particular, substances from the natural environment as the refrigerant. A cooling process of this type using $CO_2$ as refrigerant satisfies the requirements in the vehicle with respect to safety, environmental risks, efficiency and cost. $CO_2$ is a refrigerating agent with a comparatively low critical temperature so the situation may arise when the cooling of the compressed gas is no longer capable of initiating condensation, i.e. if only a cooling medium at a high temperature level is available at the gas cooler 3. The change in the constant pressure state which occurs in the cooler then takes place completely outside the saturation range.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A method for operating a cooling system for air conditioning vehicles, the cooling system having a vapor compression circuit with a high pressure side and a low pressure side, the vapor compression circuit having a compressor, a gas cooler, a throttle device and an evaporator coupled in series forming an integral, closed circuit, the method comprising the steps of:

producing a pressure on the high pressure side which, with respect to a critical pressure of a refrigerant circulating in the circuit, is supercritical, in order to make available refrigerating capacity;

at the same time, achieving a subcritical pressure on the low pressure side of the circuit, the cold refrigerant on the low pressure side is supplied via the evaporator with thermal energy and refrigerating energy being removed; and varying a refrigerant mass flow in the vapor compression circuit by regulating a refrigerant flow rate in the compressor.

2. A method according to claim 1, further comprising the step of controlling the throttle device such that a high pressure on the high pressure side of the vapor compression circuit is maintained approximately constant.

3. A method according to claim 1, further comprising the step of regulating the refrigerant flow rate in the compressor by changing an amount of refrigerant taken into the compressor.

4. A method according to claim 1, further comprising the step of regulating the refrigerant flow rate in the compressor by changing a compression stroke in the compressor.

5. A method according to claim 1, further comprising the step of regulating the refrigerant flow rate in the compressor by changing a final compression volume in the compressor.

6. A method according to claim 1, the method further comprising the step of regulating the refrigerant flow rate in the compressor by changing a speed of the compressor drive.

7. A method according to claim 1, further comprising the steps of:

selecting a desired, constant temperature as a desired value for an interior of the vehicle; and automatically controlling the refrigerant flow rate in the compressor as a function of a desired/actual deviation of an interior temperature.

8. A method according to claim 1, further comprising the step of regulating the refrigerant flow rate in the compressor by selecting a desired, constant refrigerating capacity.

9. A method according to claim 1, further comprising the step of driving the compressor at a speed which is independent of a driving speed and/or rotational speed of an engine of the vehicle.

10. A method according to claim 1, further comprising the step of driving the compressor by an engine of the vehicle.

11. A method according to claim 1, further comprising the step of using an environmentally compatible, non-combustible, non-toxic refrigerant as the refrigerant.

12. A method according to claim 11, wherein the refrigerant is $CO_2$.

13. A cooling system, comprising:

a compressor, a gas cooler, a throttle device, and an evaporator connected in series and forming an integral, closed vapor compression circuit for a refrigerant, said vapor compression circuit being divided, during operation of said cooling system, into a high pressure side and a low pressure side;

wherein on the high pressure side a pressure is set which, with respect to a critical pressure of the refrigerant, is supercritical; and means for controlling a refrigerant flow rate through the compressor.

14. A cooling system according to claim 13, wherein the throttle device is a constant throttle valve.

15. A cooling system according to claim 13, wherein the throttle device is controlled.

16. A cooling system according to claim 13, further comprising a buffer container for holding refrigerant, said buffer container being integrated in the vapor compression circuit on the low pressure side.

17. A cooling system according to claim 13, wherein the compressor further includes an adjusting device with which an intake throttle arranged on its intake side, is controlled.

18. A cooling system according to claim 13, wherein the compressor includes an adjusting device for adjusting a compression stroke of the compressor.

19. A cooling system according to claim 13, wherein the compressor includes an adjusting device for varying a final compression volume of the compressor.

20. A cooling system according to claim 13, wherein the compressor includes an adjusting device for varying a speed of a compressor drive.

21. A cooling system according to claim 13, further comprising a counterflow heat exchanger integrated into the vapor compression circuit, said counterflow heat exchanger producing a thermal connection between the high pressure side and the low pressure side.

22. A cooling system according claim 17, wherein the adjusting device is manually operated.

23. A cooling system according claim 18, wherein the adjusting device is manually operated.

24. A cooling system according claim 19, wherein the adjusting device is manually operated.

25. A cooling system according claim 20, wherein the adjusting device is manually operated.

26. A cooling system according to claim 17, wherein after a temperature value has been selected, the adjusting device is automatically operated via a control device in order to maintain a set desired temperature.

27. A cooling system according to claim 18, wherein after a temperature value has been selected, the adjusting device is automatically operated via a control device in order to maintain a set desired temperature.

28. A cooling system according to claim 19, wherein after a temperature value has been selected, the adjusting device is automatically operated via a control device in order to maintain a set desired temperature.

29. A cooling system according to claim 20, wherein after a temperature value has been selected, the adjusting device is automatically operated via a control device in order to maintain a set desired temperature.

30. A cooling system according to claim 13, wherein the compressor is drivingly connected to an engine of the vehicle.

31. A cooling system according to claim 13, further comprising a motor separate from an engine of the vehicle, said compressor being drivingly connected to said motor.

32. A cooling system according to claim 13, wherein the refrigerant is an environmentally compatible, non-combustible, nontoxic refrigerant operating under transcritical pressure conditions.

33. A cooling system according to claim 32, wherein the refrigerant is $CO_2$.

* * * * *